United States Patent
Kanarellis et al.

(10) Patent No.: US 9,385,562 B2
(45) Date of Patent: Jul. 5, 2016

(54) SYSTEM AND METHOD FOR SUPPLYING UNINTERRUPTIBLE POWER TO A POE DEVICE

(71) Applicant: KANARELLIS FAMILY LIMITED PARTNERSHIP, Houston, TX (US)

(72) Inventors: Michael Kanarellis, Houston, TX (US); Thomas Darr, Fort Myers, FL (US); Austin Blackmore, Sugar Land, TX (US); Jason Gardner, Sugar Land, TX (US)

(73) Assignee: BTU RESEARCH LLC, Houston, TX (US)

( * ) Notice: Subject to any disclaimer, the term of this patent is extended or adjusted under 35 U.S.C. 154(b) by 412 days.

(21) Appl. No.: 14/135,050

(22) Filed: Dec. 19, 2013

(65) Prior Publication Data

US 2015/0180276 A1  Jun. 25, 2015

(51) Int. Cl.
*H02J 7/00* (2006.01)
*H02J 9/00* (2006.01)
*H02J 9/06* (2006.01)
*H04L 12/10* (2006.01)

(52) U.S. Cl.
CPC . *H02J 9/061* (2013.01); *H02J 9/00* (2013.01); *H04L 12/10* (2013.01); *Y10T 307/625* (2015.04)

(58) Field of Classification Search
CPC ......... H02J 9/00; H02J 9/061; Y10T 307/625
USPC .......................................................... 307/66
See application file for complete search history.

(56) References Cited

U.S. PATENT DOCUMENTS

| | | | |
|---|---|---|---|
| 6,862,353 B2 | 3/2005 | Rabenko et al. | |
| 7,081,827 B2 | 7/2006 | Addy | |
| 7,286,556 B1 | 10/2007 | Jackson | |
| 7,325,150 B2 | 1/2008 | Lehr et al. | |
| 7,478,251 B1 | 1/2009 | Diab et al. | |
| 7,872,378 B2 | 1/2011 | Lo | |
| 8,386,832 B2 | 2/2013 | Karam et al. | |
| 8,595,550 B1 | 11/2013 | Heath et al. | |
| 2004/0095917 A1* | 5/2004 | Lehr | G06F 1/26 370/338 |
| 2006/0186739 A1 | 8/2006 | Grolnic et al. | |
| 2008/0073977 A1 | 3/2008 | Grolnic et al. | |
| 2009/0243391 A1 | 10/2009 | Susong, III et al. | |
| 2012/0080944 A1 | 4/2012 | Recker et al. | |
| 2014/0139664 A1 | 5/2014 | Herzel et al. | |

* cited by examiner

*Primary Examiner* — Carlos Amaya
(74) *Attorney, Agent, or Firm* — Andrew W Chu; Craft Chu PLLC

(57) ABSTRACT

A system and method for supplying uninterruptible power include a housing, a power supply input, a power source equipment input, a powered device output, an alternative power supply, and a control module. The control module includes a comparator, a switch, and an injector. A PoE powered device connects to the powered device output by Ethernet cable, and power source equipment connects to the power source equipment input. The control module connects the power supply input, the power source equipment input, the powered device output, and the alternative power supply. The power source equipment is powered separate from the power supply input. When the comparator detects sufficient power from the power supply unit, the switch directs power from the power supply input to the powered device. When the comparator detects insufficient power from the power supply unit, the switch instantaneously directs power from the alternative power supply to the powered device.

20 Claims, 3 Drawing Sheets

SYSTEM AND METHOD FOR SUPPLYING UNINTERRUPTIBLE POWER TO A POE DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to system and method for supplying uninterruptible power to a Power-over-Ethernet (PoE) device. More particularly, the present invention relates to a system with an injector connected to auxiliary power by a low voltage battery. The present invention relates to an uninterrupted power supply for a powered device in a remote location by an emergency PoE back-up power supply at the location of the powered device.

2. Description of Related Art Including Information Disclosed Under 37 CFR 1.97 and 37 CFR 1.98

A "Power over Ethernet" device is a powered device that works on electrical power supplied by an Ethernet cable. Power over Ethernet ("PoE") describes a technique to deliver electrical power via Ethernet cabling. A single cable transmits data and electrical power to devices, such as IP security cameras, network webcams, wireless access points, VoIP phones, network routers and others. There is no need for a separate power source for the PoE device. IEEE PoE standards set signaling standards for power source equipment, the actual power source, and the powered device, so that the powered devices and power source equipment can communicate. The power source equipment and powered device detect each other and regulate the amount of power supplied to the PoE device. By IEEE PoE standards, there is only a limited power transmission available through an Ethernet cable.

An uninterruptible power supply "("UPS"), or uninterruptible power source, provides emergency power to a powered device when the main power source is disrupted. The UPS is an immediate and generally instantaneous alternative power supply available as soon as the main power source fails. In contrast, a standby or emergency system is a separate power source, which must be activated and then switched over to supply the powered device. The immediacy and lack of delay are important for sensitive electronic equipment and continuous data processing.

The UPS protects powered devices from loss of data, loss of status information related to the powered device, and the subsequent costs associated with repair and resetting of the powered device. Those extra costs avoided can include delays in data processing, sending technicians off site to the location of the powered device, and loss of revenue from downtime of the system. UPS also prevents disruption of the software of a powered device. An unexpected loss of power may necessitate a re-boot or restart of the system, causing more delay and downtime beyond the downtime caused by the disruption of power.

In the prior art, the UPS has been an alternate power switch, activated as soon as a power disruption is detected. A switch changes the regular power supply to an alternative power source, such as a battery. Critical devices, such as heart monitors and breathing machines in a hospital room, may cease to function with an unexpected loss of power. The UPS intervenes during these moments to eliminate all the associated equipment and network downtime.

Various patents and publications are available in the field of uninterruptible power supplies. United States Patent Application No. 2012/0080944, published by Recker, et al. on Apr. 5, 2012, discloses a method and system that, in relevant part, keep a lighting grid functional in the absence of power. An intelligent control device, a wall switch, for instance, and a lighting grid must be wired to communicate with each other and have individual battery backups. When the intelligent control device identifies a power outage, it communicates to those devices with their own backups on the grid to adjust to motion and environment, as well as to change intensity and color.

For PoE devices, the incorporation of a UPS is complicated because of coordination between the power supply and the powered device. The PoE device is typically far removed from the actual power supply, such as an AC power outlet. A disruption in the AC power at the power outlet affects the power source equipment, not the PoE device. The UPS for the power source equipment is the prior art system of a battery or alternate power supply with an instantaneous switch. There is no UPS for a PoE device because the PoE device has no power cord to a power supply, as in the prior art.

United States Patent Application No. 2009/0243391, published by Susong, III, et al. on Oct. 1, 2009, describes a power supply designed to provide power to networking utilities such as routers and switches. The power supply accepts alternating current, converts it to direct current, and powers at least one PoE port. The power source also includes an internal battery backup, and redundancies to make sure the power remains continuous. In order to provide continuous power, the device includes a failover communication interface between the main power supply and a backup source operating in an off-line mode. The failover interface detects when the main power source has been interrupted, at which time the backup source becomes the on-line source to provide power to the device.

U.S. Pat. No. 7286556, issued to Jackson on Oct. 23, 2007, discloses a system and method for delivering power to a number of devices attached to a central networking device. The central networking device delivers power over an Ethernet network, and can provide backup power to those devices on the network that would normally not warrant multiple redundant power sources. The system discloses delivery of power over a cable with different wires for data and power, or over the same cable using different frequencies and filters to maintain the integrity of the signals.

The prior art systems for providing UPS for a PoE device fail to address the separation between the power source equipment and PoE devices. For example, remote network webcams connect by Ethernet cables for the power and data transmission to a control center. The control center is located miles away and monitors multiple network webcams in other locations far and near. The prior art systems provide UPS for the control center as the power source equipment for the remote network webcams. The advance prior art systems relate to prioritizing which PoE devices continue to receive power during an outage at the control center as the power source equipment. There is no disclosure of any power supply issue at the location of the PoE device. Local power management is an unnecessary redundancy of the control center management of the prior art.

However, not all remote network webcams can use the control center as power source equipment. Over long distances, the voltage necessary to transfer power and data from the control center to each remote network webcam is too high for Ethernet cables. The capacity of the Ethernet cable is insufficient to power remote PoE devices in many instances. Voltage drops or current fluctuations are created by resistance build-ups over lengthy power runs through Ethernet cables. Traditional PoE injectors overcome the long distance and Ethernet cable capacity issues. The PoE injector connects local AC power to the PoE device, concurrent with the data transmission between the control center and the PoE device. The prior art UPS systems for PoE devices do not address the injector-based systems for extensive and wide networks. Power disruptions at the local level of the injector and PoE device continue to affect systems with widespread PoE devices. A localized power outage can still disrupt PoE devices within an overall network, even as UPS prior art protects the control center. Prior art UPS systems have not yet addressed the expansion of PoE devices in wide and remote networks.

It is an object of the present invention to provide embodiments of a system and method for supplying uninterruptible power to a PoE device.

It is an object of the present invention to provide embodiments of a system and method for supplying uninterruptible low voltage power to a PoE device.

It is another object of the present invention to provide embodiments of a system and method for supplying uninterruptible power to a PoE device midspan between the powered device and the power source equipment.

It is another object of the present invention to provide embodiments of a system and method for supplying uninterruptible power to a PoE device through an injection controller.

It is still another object of the present invention to provide embodiments of a system and method for supplying uninterruptible power to a PoE device through an injection controller with an AC/DC convertor.

It is still another object of the present invention to provide embodiments of a system and method for supplying uninterruptible power to a PoE device through an injection controller with a battery backup.

It is yet another object of the present invention to provide embodiments of a system and method for supplying uninterruptible power to a PoE device at a location remote from a control center.

It is yet another object of the present invention to provide embodiments of a system and method for supplying localized uninterruptible power to a PoE device.

These and other objectives and advantages of the present invention will become apparent from a reading of the attached specifications and appended claims.

SUMMARY OF THE INVENTION

Embodiments of the present invention include a system for supplying uninterruptible power for a Power over Ethernet (PoE) device. In particular, the PoE device is remotely located from the control center of the overall network of PoE devices, and the power source for the control center is separate from each PoE device. The only power from the control center or from intervening power source equipment is transmitted by Ethernet cabling. The intervening power source equipment can be a router or network switch. The PoE device is required to source power from a more local source, while still transmitting and using data and power from the Ethernet cable. In embodiments of the present invention, the system includes a housing, a power supply input on the housing, a power source equipment input on the housing, a powered device output on the housing, an alternative power supply within the housing, and a control module within the housing. The housing is a separate unit attached between the Ethernet cabling from the control center to the powered device, the PoE device, at the location of the powered device. For example, a wall outlet near the powered device plugs into the housing at the power supply input, even though the wall outlet is separate from the power supplied through the power source equipment and control center.

On the housing, the power supply input can be a Power Supply (PS) interface. The interface can be a wall socket connection for a power cord. A power cord connects to an AC power source, such as a wall outlet. The power source equipment input, and the powered device output can have interfaces as Ethernet ports. Ethernet cables for power and data connect these devices to the housing. Power source equipment may include a PoE network switch, a non-PoE network switch, a computer network, and other power and data sources. The powered device is a PoE device, such as a wireless router, a network webcam, a voice over Internet Protocol (VoIP) telephone, a wireless access point, a camera, and a data processor.

Within the housing, the alternative power supply can be a means for storing energy, such as a battery or plurality of batteries. In some embodiments, the alternative power supply is a lithium ion battery. The alternative power supply can also be a chemically activated recharging supply, so that the alternative power supply actively stores power supplied by the system. For example, the alternative power supply can store the power from the power source equipment input by Ethernet cable and/or from the power supply input by a power cord.

Embodiments of the present invention also include the control module connected to the power supply input, the power source equipment input, the powered device output, and the alternative power supply. The control module manages the power and data received and distributed to the housing. Embodiments include the control module being comprised of an injector means, a comparator means, and a switch means. The injector means distributes collected power to the powered device. The comparator means detects the amount of power to be distributed to the powered device, whether the power comes from the power supply input, the alternative power supply or the power source equipment. The switch means directs collection of power from either the power supply input or the alternative power supply or the power source equipment or any combination thereof to the injector means for distribution. There can also be a converter means between the injector means and the power supply input to insures the proper type of power to be collected in the injector means.

In some embodiments, the injector means is comprised of a load circuit, storing power from the power supply input, the power source equipment input and the alternative power supply. The injector means distributes through the powered device output, and the comparator monitors voltage in the load circuit to insure that sufficient voltage is provided to the powered device. The power in the load circuit can be sourced from either the power supply input, the power source equipment input, or the alternative power supply. The switch means controls the sourcing.

There can be various modes of operation in embodiments of the system. The control module has a first mode of operation for supplying power to the powered device from the power supply input, a second mode of operation for supplying power to the powered device from the alternative power supply, a third mode of operation for supplying power to the powered device from the power source equipment input, a fourth mode of operation for supplying power to the alternative power supply from the power supply input, and a fifth mode of operation for supplying power to the alternative power supply from the power source equipment input. The modes of operation are managed by the switch means in communication with the comparator. Embodiments of the present invention have concurrent and incompatible modes of operation, and the switch means insures that the proper modes are selected. For example, when the comparator detects a lack of power in the load circuit, the switch means receives a signal to change the mode of operation to insure uninterrupted power distributed to the powered device from the injector means. If the mode of operation was the first mode with power from the power supply input, then the instantaneous change can be the second mode with power from the alternative power supply.

Embodiments of the present invention include the method of supplying uninterruptible power to a PoE device. The method includes monitoring voltage at the injector by the comparator and distributing power to the powered device through the injector. Then, there are the steps of detecting insufficient power by the comparator in the injector and switching power supplied to injector between the power supply input and the alternative power supply, according to any disruption in the power supply input. Insufficient power occurs when the voltage in the load circuit of the injector falls outside a threshold range. When the power supply input is supplying the power within the threshold range, a disruption causes the comparator to signal the switch to instantaneously change from the power supply input to the alternative power supply. When the disruption is resolved and when the power supply input is able to supply power within the threshold range, the comparator signals the switch to change from the alternative power supply back to the power supply input. In this manner, the alternative power supply is maintained for repeated use and can be charged in other steps of the method of the embodiments of the present invention.

DETAILED DESCRIPTION OF THE DRAWINGS

Figure 1:
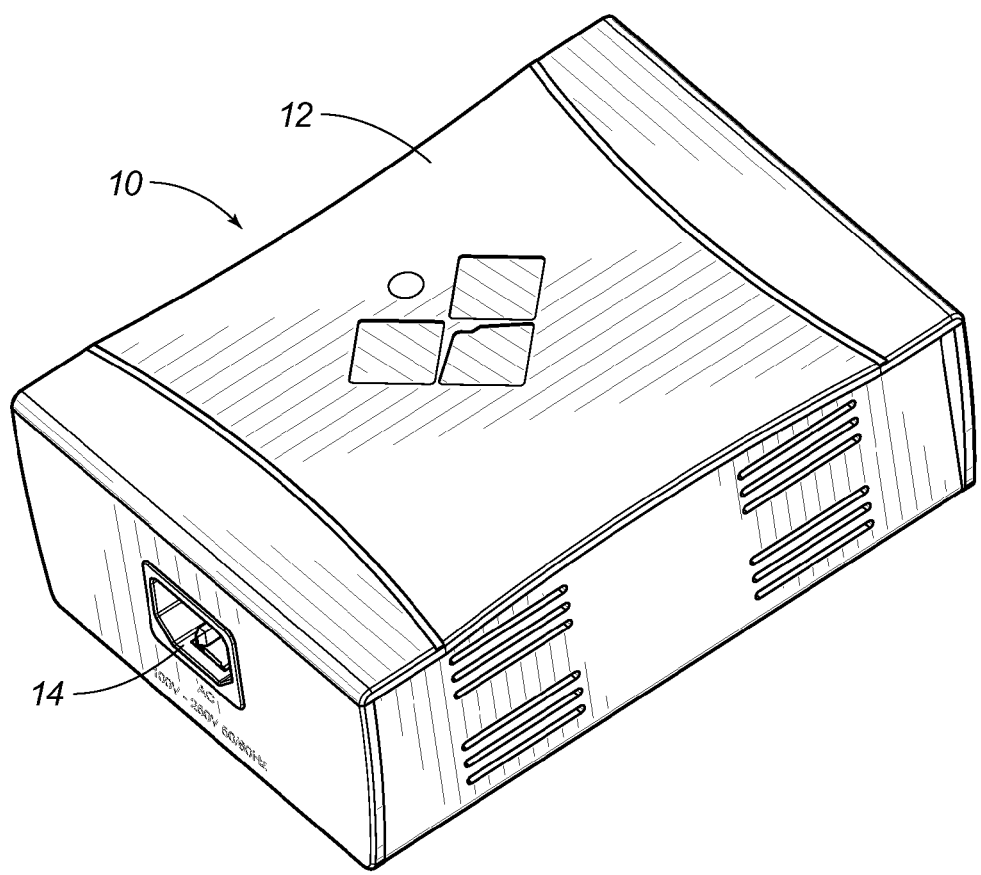
FIG. 1 is an upper perspective view of an embodiment of the system for supplying uninterruptible power, according to the present invention.

Referring to FIGS. 1-7, embodiments of the system 10 for supplying uninterruptible power are shown. The system 10 includes a housing 12, a power supply input 14, a power source equipment input 16, a powered device output 18, an alternative power supply 20, and a control module 22. FIGS. 1-4 show the housing 12 as a separate unit for placement at a location of the powered device or PoE device. The PoE device is remotely located from a control center of the overall network of PoE devices, and the power source for the control center is separate from each PoE device. The PoE device relies on the data transmission back and forth through the network from the control center. The only power from the control center or from intervening power source equipment is transmitted by Ethernet cabling. Because of the physical restraints of Ethernet cabling, not much power is transmitted to the system 10. The Ethernet cabling engages the power source equipment input 16, supplying primarily data and some power. There may be some power transmitted from the power source equipment through the power source equipment input 16, but that power is not generally sufficient to run the PoE device. As such, the intervening power source equipment can be a router or network switch. The PoE device is required to source power from a more local source, while still transmitting and using data and the bit of power from the power source equipment input 16. Ethernet cabling originating from the control center can connect to the power source equipment input 16, which connects the system 10 into the overall network of data.

FIGS. 1-4 also show the power supply input 14, which actually supplies the power for the system 10 and the powered device output 18 for the PoE device. In some embodiments, a wall outlet near the powered device plugs into the housing 12 at the power supply input 14. Other local power sources can be used, such as batteries. In the present invention, the power source connected to the power supply input 14 must be separate from the power source for the power source equipment and control center. The system 10 operates as a part of an overall system. The collection and transmission of data at remote locations, like at the system 10, are incorporated into the overall network. Power disruptions in one location will not crash the entire network. The system 10 of the present invention adds an uninterruptible power supply (UPS) to PoE devices. Previous networks only have the UPS at the control center to preserve data and avoid disruption. The system 10 of the present invention allows UPS at the remote location of the PoE device.

Figure 2:
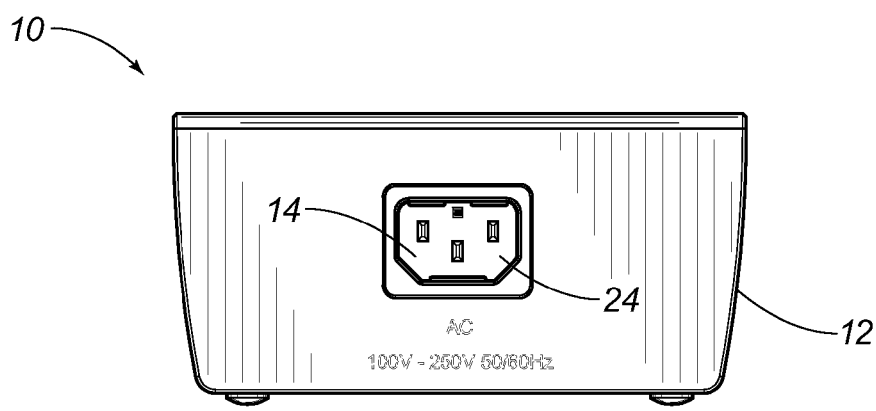
FIG. 2 is an end view of the embodiment of FIG. 1.

On the housing 12, the power supply input 14 is disposed with a Power Supply (PS) interface 24, as shown in FIGS. 1 and 2. The interface 24 is on an outside surface of the housing 12. The interface 24 is compatible as a wall socket connection for a power cord or other extension cord. The cord connects to an AC power source, such as a wall outlet. The AC power source is closer to the powered device than the control center or power source equipment within the network.

Figure 3:
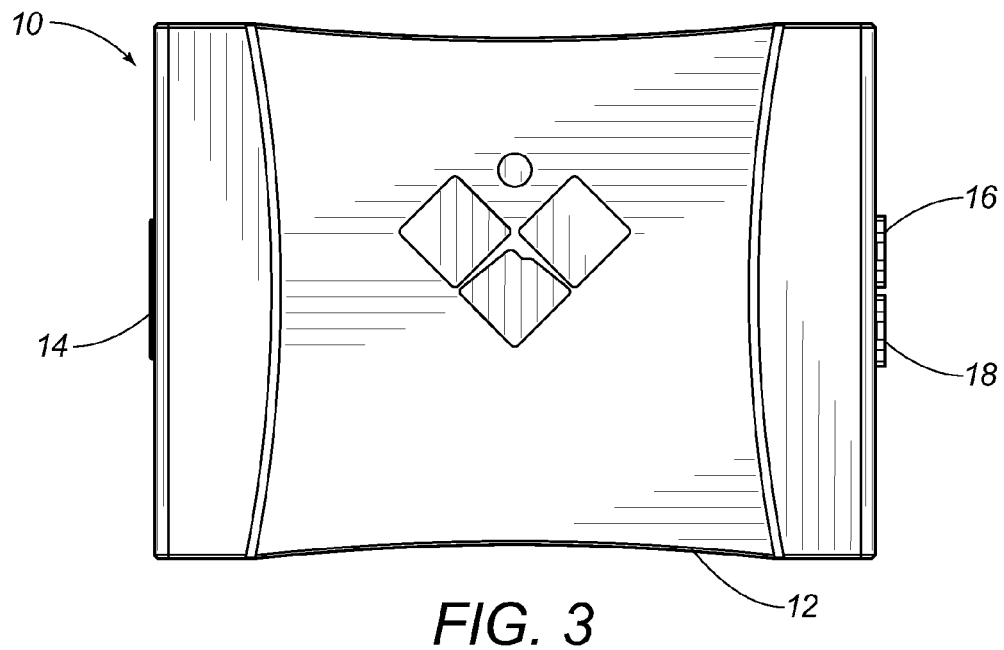
FIG. 3 is a top plan view of the embodiment of FIG. 1.
Figure 4:
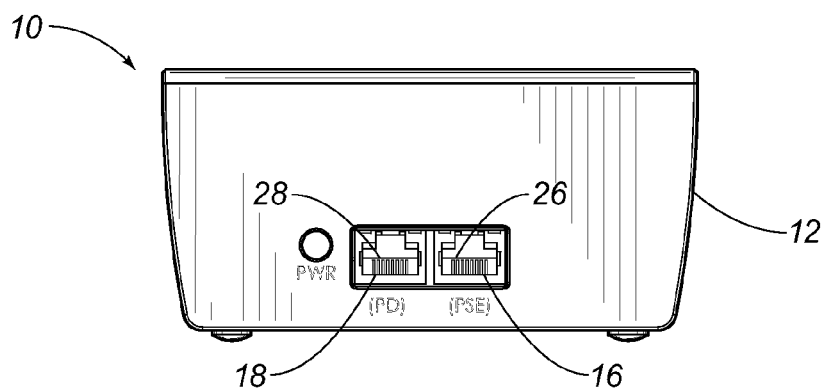
FIG. 4 is an opposite end view of the embodiment of FIG. 1.

FIGS. 3 and 4 show the power source equipment input 16, and the powered device output 18 disposed on the housing 12. The power source equipment input 16 has a power source equipment (PSE) interface 26. The powered device output 18 has a powered device (PD) interface 28. In embodiments of present invention, the PSE interface 26 and the PD interface 28 are Ethernet ports on the outside of the housing 12. Ethernet cables for power and data connect devices to the housing 12 through these interfaces 26 and 28. Other embodiments include auxiliary power supply cable port for either of the PSE interface 26 or PD interface 28. In the embodiments of FIGS. 1-5, the power source equipment input 16 connects power source equipment of the overall network. The power source equipment may include a PoE network switch, a non-PoE network switch, a computer network, and other power and data sources. The power source equipment is part of a data and power network. The power source equipment is not powered by the same power source as the system 10.

Figure 7:
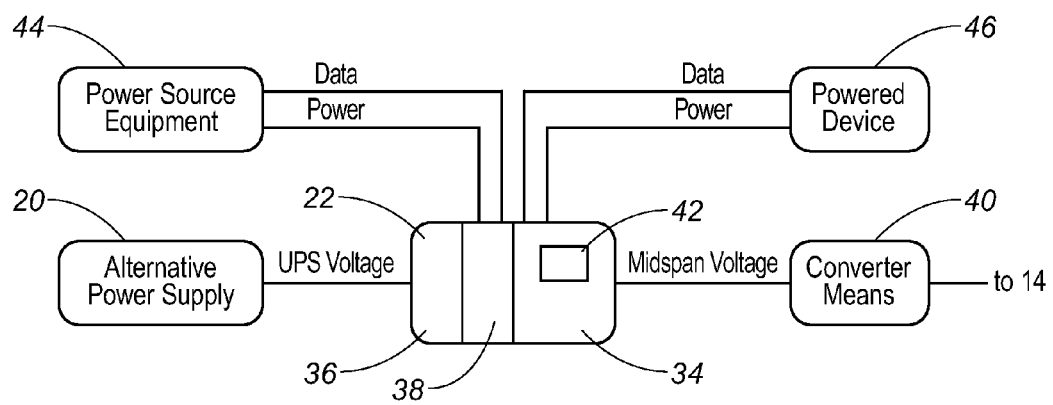
FIG. 7 is a schematic illustration of an embodiment of the system and method for supplying uninterruptible power to a PoE device, according to the present invention.

Also in the present invention, the powered device output 18 connects a powered device to the system 10. The powered device becomes part of the overall network as well, with transmission of data and power to other power source equipment, such as a control center computer. In the embodiments of FIGS. 1-5, the powered device is a PoE device, such as a wireless router, a network webcam, a voice over Internet Protocol (VoIP) telephone, a wireless access point, a camera, and a data processor. FIG. 7 shows a schematic illustration of the powered device 46. FIG. 7 also illustrates the power source equipment 44. The power source equipment can be comprised of a network and a network cable with at least one network input and network output so as to provide data and power to the power source equipment input 16. The network cable is an Ethernet cable for power and data transmission back and forth. In some embodiments, the network output has cable supply terminals, such as two 22-28 AWG conductor output supply terminals. The network cable transmits and receives data through the power source equipment input 16 to the control module 22 and to the powered device 46.

Figure 5:
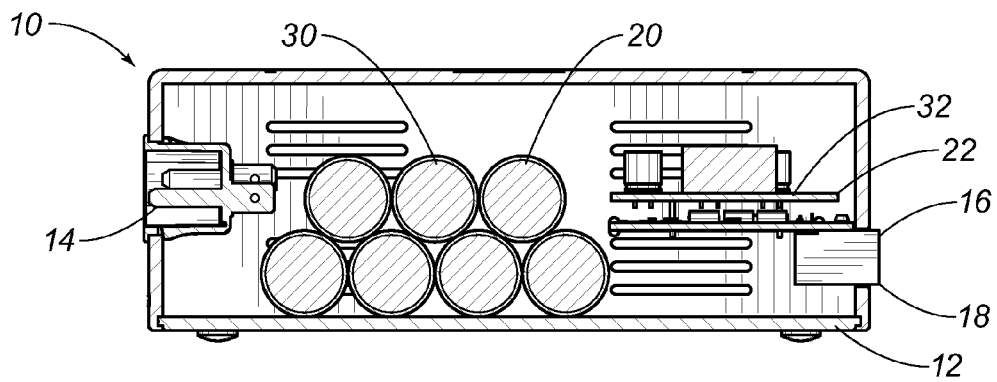
FIG. 5 is a cross-sectional view of an embodiment of the system for supplying uninterruptible power, according to the present invention.
Figure 6:
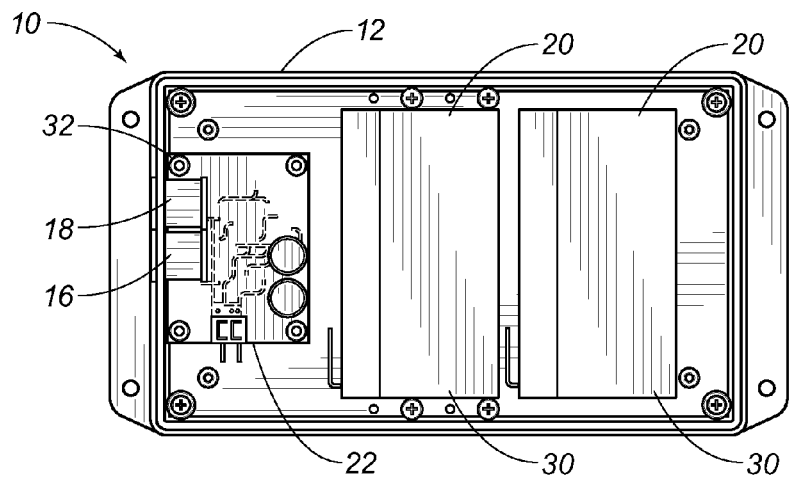
FIG. 6 is a schematic view of another embodiment of the system, according to the present invention.

FIGS. 5-6 show the embodiments of the alternative power supply 20 disposed within the housing 12. The alternative power supply 20 stores energy for use by the powered device. In some embodiments, the alternative power supply 20 is a battery 30 or plurality of batteries 30, as illustrated in different ways in FIGS. 5 and 6. In some embodiments, the alternative power supply 20 is a lithium ion battery. In the system 10, the alternative power supply 20 stores power from the power supply input 14 or the power source equipment input 16, so that the alternative power supply 20 is ready to supply power, when there is a disruption of the power supply input 14. Thus, the alternative power supply 20 can also be a chemically activated recharging supply, so that the alternative power supply 20 actively stores power supplied by the system 10. For example, the alternative power supply can store the power from the power source equipment input 16 by Ethernet cable and/or from the power supply input 14 by a power cord.

The control module 22 of the embodiments of the present invention is shown in FIGS. 5-6 as disposed within the housing 12. The control module 22 connects the power supply input 14, the power source equipment input 16, the powered device output 18, and the alternative power supply 20 into the system 10. The control module 22 manages the power and data received by the system 10 within the housing 12 and distributes data and power to through the powered device output 18 to the powered device or PoE device. The regulation of the power within the system 10 insures UPS to the powered device. There is direct connection of the system 10 between the power source equipment and the powered device, instead of direction connection of the power source equipment to the powered device. The buffering like activity of the control module 22 preserves the powered device on the overall network and simultaneously allows for the local connection of the power source to the powered device. UPS for a PoE device is possible with the intervention of the system 10 of the present invention. The particular power regulation by the system 10 is beyond the prior art.

Embodiments of the system 10 in FIGS. 5-7 include the control module being comprised of an injector means 34, a comparator means 36, and a switch means 38 on a printed circuit board (PCB) 32. FIG. 7 shows a schematic view. The PCB 32 is disposed within the housing 12. The injector means 34 collects and distributes data and power to the powered device through the powered device output 18. The injector means 34 connects the power source equipment input 16, the power supply input 14, and the alternative power supply 18 to the powered device output 20. The comparator means 36 detects power from the power supply input 14 and power to the powered device output 18. The comparator means 36 monitors the amount of power to be distributed to the powered device, whether the power comes from the power supply input 14, the alternative power supply 20 or the power source equipment input 18. For UPS, the power from the powered device output 18 must be maintained for operation of the powered device without regard to the source, so that disrupted sources do not disrupt the powered device. In the present invention, the power supply input 14 connects to a power supply separate from the power supply of the power source equipment. The switch means 38 selects collection of power from either the power supply input 14 or the alternative power supply 20 or the power source equipment input 18 or any combination thereof to the injector means 34 for distribution. The switch means 38 enables UPS so that power through the powered device output is stable for the powered device.

According to the monitoring of the comparator means 36, the switch means 38 makes a particular connection between either the power supply input 14 or the alternative power supply 20 to the injector means 34. Although there may be some residual power through the power source equipment input 16, along with the data from the power source equipment, embodiments of the present invention do not rely on this residual power for the powered device output 18. The residual power from the power source equipment input 16 can be used to charge the alternative power supply 20 or to contribute to the injector means 34 for the powered device output 18. However, the system 10 is usually located so far away from the power source equipment that the Ethernet cables are very long. The distance of the Ethernet cabling diminishes the amount of residual power able to be harnessed at the power source equipment input 16 by the system 10. Thus, the switch means 38 generally flips between the power source input 14 and the alternative power supply 20 for supplying the injector means 34.

In some embodiments, there is a converter means 40 of the control module 22 placed between the injector means 34 and the power supply input 14. When the power source supplies alternating current (AC) to the power supply input 14, the converter means 34 can change the AC to direct current (DC). The DC is compatible with the powered device, and the DC can be distributed from the injector means 34 to the powered device output 18. The control module 22 regulates the power supplied and the power distributed, and the converter means 40 facilitates the conversions between AC and DC. The proper type of power is supplied through the powered device output 18 according to the injector means 34.

In some embodiments, the injector means 34 is comprised of a load circuit 42, represented schematically in FIG. 7. The load circuit 42 can store power from the power supply input 14, the power source equipment input 16 and the alternative power supply 20. The injector means 34 distributes the power in the load circuit 42 through the powered device output 18 to the powered device. The comparator means 36 monitors voltage in the load circuit 42 to insure that sufficient voltage is provided through the powered device output 18, regardless of the source supplying the load circuit 42. The power in the load circuit 42 can be sourced from either the power supply input 14, the power source equipment input 16, or the alternative power supply 20, although the power supply input 14 or the alternative power supply 20 are generally more typical than the power source equipment input 16. The switch means 38 controls which source contributes to the load circuit 42.

The control module 22 sets various modes of operation in embodiments of the system 10. The control module 22 has a first mode of operation for supplying power to the powered device from the power supply input 14. The first mode is normal operation with a wall socket at the location of the powered device. With the powered device as a PoE device, the data remains transmitted by Ethernet cable and the power is supplanted by a local source, instead of power transmitted by Ethernet cable. The PoE device is not constrained to be at a certain distance from the power source equipment in order to be functional. Prior art injectors can operate in the first mode as the normal mode. The drawback remains power disruption for these PoE devices with local source power.

Embodiments of the present invention include different modes beyond the prior art injectors to achieve UPS for the PoE device. The switch means 38 manages the modes of operation of the control module 22. There is a second mode of operation for supplying power to the powered device from the alternative power supply 20, a third mode of operation for supplying power to the powered device from the power source equipment input 16, a fourth mode of operation for supplying power to the alternative power supply 20 from the power supply input 14, and a fifth mode of operation for supplying power to the alternative power supply 20 from the power source equipment input 16. The second mode is the emergency mode to supply power without interruption, when the power supply input 14 is disrupted. A local power outage no longer disrupts the PoE device because of the system 10 with UPS in the particular situation of local power and network data. The instantaneous switch from the first mode to the second mode prevents the need for resets and service calls to remote locations during a local power outage.

The third mode includes harnessing whatever power is transmitted through the Ethernet cable to the power source equipment input 16. Although primarily used for data, especially for transmissions over long distances, there may still be some residual power. This power can still be collected by the load circuit 42 of the injector means 34 for distribution through the powered device output 18. The fifth mode is another variation with the residual power collected by the load circuit 42 being distributed to the alternative power supply 20 for recharging. A power disruption at the power source equipment affects this power. A power disruption at the power supply input 14 does not affect this power. The prior art UPS systems at the power source equipment prevent disruptions through the Ethernet cable to the system 10.

The fourth mode is another possible part of normal operation. The alternative power supply 20 is charged by power from the load circuit 42 of the injector means 34, when the power supply input 14 is active. When there are no disruptions, the alternative power supply 20 is charged so that the alternative power supply 20 is ready to supply, if any power disruption were to occur at any time. The first and fourth modes of operation are incompatible with the second mode of operation. The emergency UPS mode of the second mode means that the power supply input 14 has been disrupted. So no parts of the system 10 rely on the power supply input 14.

The modes of operation are managed by the switch means 38 in communication with the comparator means 36. Embodiments of the present invention have concurrent and incompatible modes of operation. For example, the injector means 34 continues to distribute data from the power source equipment input 16 to the powered device and continues to collect power from the power source equipment input 16 for the third and fifth modes of operation. The third and fifth modes of operation are concurrent with each other and with other modes of operation. The switch means 38 of the control module 22 insures that the proper modes are selected. In another instance, the third and fifth modes are concurrent with the first and fourth modes during normal operation. The power supply input 14 at the local source supplies the power to the injector means 34. A disruption of the power supply input 14 triggers the switch means 38 to activate the second mode, instead of the first and fourth. The data continues from the power source equipment input 16 in the third and fifth modes. In some embodiments, the injector means 34 distributes power through the powered device output 18 in a range of 12 VDC to 24 VDC, regardless of the particular mode of operation. The UPS is the supply of this range of power through all power disruptions for a PoE device.

FIG. 7 illustrates the comparator means 36 and the switch means 38 according to embodiments of the present invention. The comparator means 36 detects a drop in power in the load circuit 42 of the injector means 34, and the switch means 38 receives a signal from the comparator means 36 to change the mode of operation, which insures uninterrupted power distributed to the powered device from the injector means 34. If the mode of operation was the first mode with power from the power supply input 14, then the instantaneous change can be the second mode with power from the alternative power supply 20.

The comparator means 36 activates the switch means 38, when the voltage of the load circuit 42 of the injector means 34 falls outside a threshold range. The comparator means 36 monitors the voltage in the load circuit 42 and has an initialization mode to send an initialization signal to the switch means 38, when the voltage falls outside of the threshold range. The initialization signal triggers the switch means 38 to change the mode of operation of the control module 22. For example, the first mode of the load circuit 42 being supplied by the power supply input 14 can be switched to being supplied by the alternative power supply 20 of the second mode. The initialization mode corresponds to a power disruption.

A power disruption is not permanent, and local power is eventually restored so that the power supply input 14 can become an active power source to the load circuit 42 of the injector means 34 again. It is recommended to return the control module 22 back into normal operation in the first mode so that the alternative power supply 20 is not exhausted and drained. In some embodiments, the comparator means 36 also connects to the power supply input 14 to monitor the voltage of the power supply input 14. When the power disruption is over, the comparator means 36 detects voltage in the power supply input 14 within the threshold range of the injector means 34. The comparator means 36 enters a reinitialization mode to send a reinitialization signal to the switch means 38. The reinitialization signal triggers the switch from the second mode back to the first mode. The load circuit 42 of the control module 22 switches from the alternative power supply 20 back to the power supply input 14.

In some embodiments, the comparator means 36 is comprised of at least one diode connected to the load circuit 42, and a diode circuit coupled to the at least one diode. The diode circuit contains the information related to the threshold range and generates the initialization signal and reinitialization signal when voltage falls across the threshold range. In one variation, the comparator means 36 further comprises a thermal protection switch to initiate a power shutdown in response to a thermal overload event. There is also the variation with another diode connected to the power supply input 14 to detect voltage from the local power source. The other diode monitors the reinitialization when power is restored to the local power source.

Similarly, the switch means 38 can also be comprised of a diode circuit with at least one circuit input connected to the power supply input 14 and at least one circuit input connected to the alternative power supply 20. The first mode makes the connection between the power supply input 14 and the injector means 34 for the powered device. The second mode makes the connection between the alternative power supply 20 and the injector means 34 for the powered device. The second mode is the emergency mode for UPS during a local power outage and disruption of the power supply input 14. The diode circuits can be re-activated to return to normal operation, when power from the power source input 14 is detected. The switch is instantaneous.

Embodiments of the present invention include the method of supplying uninterruptible power to a PoE device as illustrated in FIG. 7. The system 10 is used to provide UPS to the PoE device, even though the PoE device has a local power source through the power supply inlet 14. The method includes monitoring voltage at the injector by the comparator and distributing power to the powered device through the injector. The load circuit 42 is monitored to remain within a threshold range of voltage. The threshold range corresponds to sufficient power to operate the powered device 46. The origin of the power is not measured because UPS requires sufficient power without regard to origin.

Then, there are the steps of detecting insufficient power by the comparator in the injector and switching power supplied to injector. Insufficient power occurs when the voltage in the load circuit of the injector falls outside the threshold range. The connection of the power sources, the power supply input 14 and the alternative power supply 20, are assessed whenever a power disruption is detected. When the power supply input was supplying the power within the threshold range, the detection of the fall outside of the threshold range causes the comparator to signal the switch to instantaneously change from the power supply input to the alternative power supply. The powered device continues without interruption. Since the alternative power supply is limited, the comparator continues to monitor the voltage at the load circuit of the injector and the voltage at the power supply input, after the step of switching to the alternative power supply. When the disruption is resolved and when comparator detects voltage from the power supply input able to supply power within the threshold range of the load circuit, the comparator signals the switch to change from the alternative power supply back to the power supply input. In this manner, the alternative power supply is maintained for repeated use and can be charged in other steps of the method of the embodiments of the present invention.

The analogous steps of the third, fourth, and fifth modes of operation are also included in embodiments of the method of the present invention. The method includes supplying power and data through the power source equipment input for the third and fifth modes of the control module 22. The step of charging or re-charging the alternative power supply through the power source equipment input is also disclosed. The re-charging of the alternative power supply through the power supply input of the fourth mode of operation is another step of the embodiments of the method of the present invention.

The present invention provides a system and method for supplying uninterruptible power to a PoE device. The PoE device at a remote location from the power source equipment and control center of the overall network can have UPS with the system of the present invention. The complications of the data and power transmission and integration with local power sources are resolved by the present invention. Also, the voltage of the power source equipment through Ethernet cable can be used to charge the alternative power supply, such that UPS may even be possible at low voltages set by Ethernet cable standards. The present invention enables separates the effects of power disruptions at the power source equipment and at the powered device. The UPS is provided midspan between the powered device and the power source equipment. The alternative power supply as battery or battery backups instantaneously become the power source for the PoE device. Rechargeable battery options further extend the working life and independence of the present invention. In some embodiments, the system includes an injection controller or control module to manage the low voltage power of the Ethernet cable and the local power at the powered device. An AC/DC converter further adapts the system to be compatible with wall sockets at any location remote from the central network.

The foregoing disclosure and description of the invention is illustrative and explanatory thereof. Various changes in the details of the illustrated structures, construction and method can be made without departing from the true spirit of the invention.

We claim:

1. A system for supplying uninterruptible power, comprising:
   a housing;
   a power supply input disposed within said housing, said power supply input having a PS interface on an outside of said housing;
   a power source equipment input disposed within said housing, said power source equipment input having a PSE interface on an outside of said housing;
   a powered device output disposed within said housing, said powered device output having a PD interface on an outside of said housing;
   an alternative power supply disposed within said housing;
   a powered device connected to said powered device output by an Ethernet cable;
   power source equipment connected to said power source equipment input, said power source equipment being powered separate from said power supply input and said alternative power supply; and
   a control module connected to said power supply input, said power source equipment input, said powered device output, and said alternative power supply, said control module being comprised of an injector means, a comparator means, and a switch means, said injector means connecting said power source equipment input, said power supply input, and said alternative power supply to said powered device output, said comparator means detecting power from said power supply input and to said powered device output, said switch means connecting said power supply input and said alternative power supply to said injector means.

2. The system for supplying uninterruptible power, according to claim 1, wherein said control module further comprises a converter means connected between said injector means and said power supply input.

3. The system for supplying uninterruptible power, according to claim 1, said alternative power supply being comprised of a chemically activated recharging power source.

4. The system for supplying uninterruptible power, according to claim 1, said injector means being comprised of a load circuit, said load circuit storing power from at least one of said power supply input, said power source equipment input and said alternative power supply, said load circuit distributing power to said powered device output,
   wherein said comparator means monitors voltage of said load circuit,
   wherein said control module has a first mode of operation for supplying power to said powered device from said power supply input, a second mode of operation for supplying power to said powered device from said alternative power supply, a third mode of operation for supplying power to said powered device from said power source equipment input, a fourth mode of operation for supplying power to said alternative power supply from said power supply input, a fifth mode of operation for supplying power to said alternative power supply from said power source equipment input, wherein the first mode and the fourth mode are not concurrent with the second mode, and wherein said switch means manages the modes of operation of said control module.

5. The system for supplying uninterruptible power, according to claim 1, said injector means connecting said power source equipment input to said powered device so as to distribute data between said power source equipment and said powered device.

6. The system for supplying uninterruptible power, according to claim 1, said injector means distributing power to said powered device at a distribution range between 12 VDC and 24 VDC.

7. The system for supplying uninterruptible power, according to claim 4, said comparator means activating said switch means when voltage of said load circuit of said injector means falls outside a threshold range.

8. The system for supplying uninterruptible power, according to claim 7, said comparator means having an initialization mode and sending a initialization signal to said switch means, wherein said initialization signal triggers said switch means to change supplying power to said load circuit from said power supply input to said alternate power supply, said control module switching from the first mode to the second mode.

9. The system for supplying uninterruptible power, according to claim 7, said comparator means detecting voltage of said power supply input, said comparator means activating said switch means when voltage of said power supply input is sufficient to supply power to said load circuit within said threshold range, said comparator means having a reinitialization mode and sending a reinitialization signal to said switch means, wherein said reinitialization signal triggers said switch means to change supplying power to said load circuit from said alternative power supply to said power supply input, said control module switching from the second mode to the first mode.

10. The system for supplying uninterruptible power, according to claim 9, said comparator means comprising at least one diode connected to said power supply input; and a diode circuit coupled to said at least one diode, said diode circuit defining said threshold range of said injector means.

11. The system for supplying uninterruptible power, according to claim 7, said comparator means further comprising a thermal protection switch to initiate a power shutdown in response to a thermal overload event.

12. The system for supplying uninterruptible power, according to claim 4, said switch means alternating instantaneously between supplying power to said injector means by said power supply input and said alternative power supply.

13. The system for supplying uninterruptible power, according to claim 12, said switch means being comprised of a diode circuit with at least one circuit input connected to said power supply input and at least one circuit input connected to said alternative power supply.

14. The system for supplying uninterruptible power, according to claim 2, said converter means receiving power from an AC power source and transmitting converted DC power to said control module, said converter means being connected between said power supply input and said injector means so as to provide DC power from an AC source connected to said power supply input.

15. The system for supplying uninterruptible power, according to claim 1, wherein said power source equipment is comprised of a network and a network cable with at least one network input and network output so as to provide data and power to said power source equipment input, and wherein said network output is comprised of a cable supply terminals, said cable supply terminals being two 22-28 AWG conductor output supply terminals.

16. A method of supplying uninterruptible power, said method comprising:
providing a system according to claim 1;
monitoring voltage at said injector means with said comparator means;
supplying power from said power supply input to said powered device through said injector means;
detecting insufficient power at said injector means by said comparator means;
switching power to said powered device from said power supply input to said alternative power supply;
monitoring voltage at said power supply unit after the step of switching from said power supply unit to said alternative power supply;
detecting sufficient power from said power supply input with said comparator means; and
switching power to said powered device from said alternative power supply to said power supply input.

17. The method for supply uninterruptible power, according to claim 16, wherein the step of detecting insufficient power is comprised of detecting voltage outside of a threshold range, and wherein the step of detecting sufficient power is comprised of detecting voltage to maintain said injector means within said threshold range.

18. The method for supply uninterruptible power, according to claim 16, further comprising the step of:
supplying power from said power source equipment input to said powered device through said injector means.

19. The method for supply uninterruptible power, according to claim 16, further comprising the step of:
supplying power from said power source equipment input to said alternative power supply through said injector means.

20. The method for supply uninterruptible power, according to claim 16, further comprising the step of:
supplying power from said power supply input to said alternative power supply through said injector means.

* * * * *